United States Patent [19]

Dhake

[11] 4,097,437
[45] Jun. 27, 1978

[54] THIXOTROPIC AQUEOUS COATING COMPOSITION OF SOLUBILIZED POLYMER WITH DISPERSION OF QUATERNARY AMMONIUM CLAY IN ALIPHATIC HYDROCARBON

[75] Inventor: Bhimashanker Gopal Dhake, Livonia, Mich.

[73] Assignee: M & T Chemicals Inc., Stamford, Conn.

[21] Appl. No.: 801,224

[22] Filed: May 27, 1977

[51] Int. Cl.$^2$ .......................... C08J 3/08; C08K 5/19; C08K 9/04; C09D 5/04
[52] U.S. Cl. .................. 260/29.2 E; 260/29.4 R; 260/29.4 UA; 260/29.6 MH; 260/29.6 MN; 260/42.16
[58] Field of Search ................. 260/29.2 E, 29.2 UA, 260/29.6 MH, 29.6 MN, 29.4 R, 29.4 UA, 42.16, 18 R, 22 R

[56] References Cited

U.S. PATENT DOCUMENTS

| 2,511,895 | 6/1950 | Bacon | 260/29.2 E |
|---|---|---|---|
| 3,515,689 | 6/1970 | Brane et al. | 260/29.2 UA |
| 3,631,136 | 12/1971 | Spiller | 260/29.2 E |
| 3,887,645 | 6/1975 | Schwarcz | 260/29.2 E |
| 3,974,125 | 8/1976 | Oswald et al. | 260/864 |

Primary Examiner—Murray Tillman
Assistant Examiner—Arthur H. Koeckert
Attorney, Agent, or Firm—Kenneth G. Wheeless; Robert Spector

[57] ABSTRACT

Aqueous solutions of polymers are rendered thixotropic by addition of a dispersion in aliphatic hydrocarbon of quaternary ammonium modified smectite clay, monohydric alcohol, and cationic surfactant. Conventional soluble film forming polymers include polyvinyl alcohol, polyvinyl acetate, amine neutralized polyester, and acrylic and methacrylic acid copolymers. Also silica flatting agent, flow control agent, pigment, wax and aminoplast cross-linker can be added.

6 Claims, No Drawings

THIXOTROPIC AQUEOUS COATING COMPOSITION OF SOLUBILIZED POLYMER WITH DISPERSION OF QUATERNARY AMMONIUM CLAY IN ALIPHATIC HYDROCARBON

BACKGROUND OF THE INVENTION

Latex type coatings containing an emulsified film-forming polymer in an aqueous medium are eminently suitable for use on a wide variety of exterior and interior surfaces. The thixotropic nature of these coatings makes it possible to apply relatively thick coatings to vertical surfaces, such as walls, without running or "sagging". The latter phenomenon produces a curtain-like appearance which is unacceptable. Once the liquid phase of a latex type paint evaporates the polymer particles are no longer dispersible in water. This can cause problems if the coating is applied by spraying. In conventional paint spraying equipment the coating composition is mixed with a high velocity air stream and is atomized to form small droplets. The mixture of air and finely divided coating composition emerges through a small orifice from which it travels to the surface to be coated. When the air supply to the gun is turned off, a drop or two of the polymer emulsion usually remains at the orifice of the spray gun. Once the water and other volatile components evaporate the polymer is no longer emulsifiable in water. The resultant solid particle of polymer may partially or completely obstruct the small orifice at the tip of the spray gun and is not dislodged by the coating composition employed in a subsequent spraying operation. The polymer particles must be forcibly dislodged before spraying can be continued.

The problem of orifice obstruction in spraying equipment can be avoided using coatings containing film-forming polymers that are soluble in the liquid medium rather than being emulsified as in a latex type coating. Even after the liquid evaporates the polymer remains soluble so long as it does not undergo cross-linking. Any polymer that accumulates at the orifice of the spray gun is redissolved when contacted by the next portion of coating material passing through the nozzle of the gun. Unfortunately this desirable property of coatings containing a solubilized film-forming polymer is often more than offset by the tendency of this type of coating to "run" and blister when an attempt is made to apply films more than about 0.001 inch (0.003 cm.) thick. Blistering occurs when the surface of a film solidifies before the volatile material in the lower layers has evaporated. As this volatile material evaporates it breaks through the surface film at random points, forming craters resembling miniature volcanos. The final coating assumes a blistered appearance. A second disadvantage of coating compositions containing solubilized polymers is that they do not exhibit the thixotropy that characterizes the aforementioned latex type coating compositions. While compositions containing solubilized polymers exhibit superior leveling properties by virtue of their lower viscosity in the absence of shear, they cannot be applied as thick films to vertical surfaces without running and sagging.

It is an objective of this invention to define an aqueous coating composition that exhibits the desirable film-forming and application properties of a latex type coating, yet which will not leave insoluble residues on spraying equipment following evaporation of the volatile components, thereby avoiding the problem of orifice clogging.

It has now been found that this desired combination of properties can be achieved if a small amount of a gel formed from a amine-modified smectite clay and a water-immiscible liquid hydrocarbon is added to an aqueous coating composition containing a solubilized film-forming polymer.

SUMMARY OF THE INVENTION

This invention provides a thixotropic aqueous coating composition comprising (1) from 15 to 25%, based on the weight of said composition, of a film-forming, solubilized polymer, (2) from 0.5 to 5%, based on the weight of said composition, of finely divided silica, (3) sufficient water to achieve a concentration of non-volatile materials of from 30 to 60%, based on the weight of said composition, (4) from 0.5 to 5%, based on the weight of said composition, of a smectite type clay which has been modified by reaction with a quaternary ammonium salt of the general formula $R_2^1R_2^2N^\oplus X^\ominus$ wherein $R^1$ is alkyl and contains from 1 to 4 carbon atoms, $R^2$ is alkyl and contains from 12 to 20 carbon atoms and X is chlorine or bromine, said smectite clay being present as a dispersion in a water-immiscible liquid aliphatic hydrocarbon that constitutes from 1 to 10% of the total weight of said aqueous coating composition and boils within the range from 100° to 200° C, (5) from 0.1 to 1%, based on the weight of said composition, of a monohydric alcohol containing from 1 to 3 carbon atoms, and (6) from 0.5 to 5%, based on the total weight of said composition, of a cationic surfactant.

DETAILED DESCRIPTION OF THE INVENTION

The unique feature of the present aqueous coating compositions resides in the presence of a particular type of water-immiscible gel phase which imparts the desired degree of thixotropy to the composition, thereby allowing it to be applied as a relatively thick film which maintains its coherency in the absence of shear forces.

The solid portion of the gel phase is a finely divided smectite clay, the surface of which has been modified by treatment with a quarternary ammonium compound of the formula $R_2^1R_2^2N^\oplus X^\ominus$ wherein $R^1$ is lower alkyl and contains from 1 to 4 carbon atoms, $R^2$ is alkyl and contains from 12 to about 20 carbon atoms and X is usually chlorine or bromine. Alternatively X can be any inert, monovalent cation, including fluoride, iodide and acetate. The clay is dispersed in a liquid hydrocarbon that boils within the range from about 100° to 200° C. Lower boiling liquid hydrocarbons such as pentane and hexane are not suitable, since they vaporize rapidly as the final coating is dried and baked, resulting in the formation of small holes in those areas where the vaporized solvent forces its way through the coating. This phenomenon results in the undesirable effect commonly referred to as "blistering".

Liquid hydrocarbons boiling above about 200° C. are not useful because they may remain in the final coating following baking and adversely affect the properties thereof, particularly adhesion to the substrate.

In addition to the liquid hydrocarbon, which constitutes from 1 to about 10% of the coating composition, the clay dispersion preferably contains from 0.1 to about 1% by weight of an alcohol containing from 1 to 3 carbon atoms and a small amount, usually from 0.5 to about 5%, of a surfactant. The purpose of the alcohol and surfactant is to ensure that the clay dispersion will be retained in an emulsified state in the aqueous coating composition.

The film-forming polymer may also function as a surfactant due to the presence of hydrophylic groups such as carboxyl groups and oleophylic hydrocarbon chains, however this may be insufficient to retain the clay particles in an emulsified state.

When it is desired to impart thixotropy to an aqueous coating composition one would usually employ a water-sensitive thixotrope such as methylcellulose, unmodified bentonite or other smectite clay or a slightly cross-linked high molecular weight sodium acrylate polymer. In aqueous compositions these materials form gels. Under high shear such as would be encountered when the coating composition is applied to a surface by brushing or spraying, the gel structure breaks down and the viscosity of the composition is reduced by as much as 100 fold.

The gel systems employed in the present aqueous coating compositions are not miscible with water. One would therefore not expect these systems to be compatible with aqueous compositions or to impart thixotropy to these compositions. The ability of these gel systems to supply the desired degree of thixotropy to the present compositions is therefore fortuitous and unexpected.

The present gel systems are prepared using conventional procedures for dispersing clays in non-aqueous media. Preferably the clay is combined with from 30 to 40% by weight of an alcohol and a cationic surfactant under high shear to form a homogeneous mixture. The liquid hydrocarbon is then added in the desired amount, which may be from 50 to 90%, based on the weight of the gel system.

The aqueous phase of the present coating compositions contains a solubilized film-forming polymer and water. Preferably a pigment, a flattening agent such as silica to reduce gloss and a flow control agent such as a low molecular weight acrylic polymer are also included in the formulation.

Any one of the conventional water-soluble film-forming polymers are suitable for use in the present coating compositions. Polyvinyl alcohol, polyvinyl acetate and amine-neutralized polyesters having acid numbers of from 30 to about 70 are examples of useful film-forming binders. Copolymers containing repeating units derived from acrylic or methacrylic acid in an amount sufficient to solubilize the polymer following neutralization are also suitable. The polyesters and acrylic or methacrylic acid copolymers are solubilized by reacting substantially all of the carboxyl groups present at the ends and along the backbone of the polymer molecules with an amine. The salt formed as a product of this reaction is soluble in water, however the resultant material is often a colloidal solution that exhibits the Tyndall effect. The polyesters are prepared from any of the available dicarboxylic acids and diols. Preferably a trifunctional acid such as trimellitic acid is included in the reaction mixture to introduce carboxylic acid groups along the backbone of the polymer chain. A small amount of glycerine or other trifunctional alcohol may also be employed to introduce hydroxyl groups that are subsequently reacted with a cross-linking agent such as melamine.

The present coating compositions often contain up to 20% by weight of one or more pigments such as titanium dioxide, zinc oxide and iron oxide and extenders such as barium sulfate, silica and magnesium silicate.

A natural or synthetic wax may be included in the coating composition to improve abrasion resistance of the final coating.

Depending upon molecular weight and viscosity, the solubilized film-forming polymer constitutes from 15 to 25% by weight of the coating composition. If the film-forming polymer is a polyester or a copolymer of an ethylenically unsaturated acid, it is solubilized by reacting the free carboxylic acid groups with a suitable amine. Preferably the amine is relatively non-volatile to ensure that it will not evaporate before the water and cause the polymer to coagulate.

To develop optimum properties in the final coating and make it resistant to organic solvents and hydrolysis, it is desirable to include a heat-activatible cross-linking agent in the coating composition. A preferred class of cross-linking agents include methylated melamines, ureas, benzoguanamines and phenols condensed with free or "blocked" methylol groups. Upon heating, these products react with hydroxyl or carboxyl groups on adjacent polymer molecules to produce a cross-linked structure. The cross-linking agents constitute from 1 to about 10% by weight of the total coating composition, depending upon the concentration of reactive groups present in the film-forming polymer.

The following examples disclose a preferred embodiment of the present coating compositions and demonstrate that the desirable properties of these compositions are not achieved when one of the critical components is omitted or replaced by one that is not within the scope of the accompanying claims. All parts and percentages are by weight unless otherwise specified.

EXAMPLE 1

A water-based coating composition was prepared using the following procedure. Part 1 of the formulation was prepared by combining 137 parts of an 80% by weight n-butanol solution of a commercially available water-solubilizable polyester resin distributed by Cargill Chemical Corporation as Resin 7201-80 (acid number 50–60), 9.5 parts of dimethylethanolamine, 67.5 parts deionized water and 47 parts of a methylated melamine available as Cyplex ® 303 from the American Cyanamide Corporation. The pH of the resultant mixture was adjusted to from 7.5 to 7.7 by the addition of a 1/1 volume ratio mixture of dimethylethanolamine/water as required. To the resultant mixture was added part 2, which contained 19.0 parts of finely divided silica (average particle diameter = 7 microns), 116.5 parts of barium sulfate in the form of barytes and 9.5 parts of a micronized polyethylene wax (melting range = 230°–235° C., average particle size = 4 microns). The mixture of parts 1 and 2 was homogenized and then stirred at high speed for about one hour using a Cowles type stirring blade. Deionized water from a 23.0 parts portion was added as needed to maintain a workable viscosity level. Stirring was continued until the mixture exhibited a fineness of grind equivalent to a value of at least 3 on the Hegman N.S. scale. Any remaining water from the aforementioned 23.0 parts was then added together with part 3 of the formulation, which contained 101.0 parts of the aforementioned butanol solution containing 80% by weight of the aforementioned water-solubilizable polyester resin and 4.0 parts of a flow control agent (a low molecular weight acrylic ester polymer available as Resimix N from Mohawk Industries). An amount of a 50% by weight aqueous solution of dimethylethanolamine sufficient to achieve a pH of 7.5–7.7 was then added to the resultant mixture. To this mixture was added part 4 of the formulation, which contained (1) 150.0 parts of deionized water, (2) 64.0 parts of odorless mineral spirits (a mixture of liquid saturated hydrocarbons having a boiling range from 179° to 198° C. and a kauri butanol value of 27), (3) 40 parts of a mixture which had been previously prepared by combining 80.0 parts of the aforementioned odorless mineral spirits with 10 parts of a finely divided smectite clay which had been modified by combining the clay with an excess of a solubilized dimethyl dioctadecyl ammonium salt and 7.5 parts of a cationic surfactant (a salt of a long-chain polyaminoamide and an acid ester, iodine value of about 35, pH in aqueous solution = 6–8; the surfactant is a member of the class disclosed in German Pat. No. 1,157,327), (4) 2.4 parts methanol and 0.1 part of deionized water, and (5) 5.0 parts of a 10% by weight solution of a poly (oxyethylene oxypropylene) siloxane (available as L-5310 from Union Carbide Corporation) in the monobutyl ether of ethylene glycol. The pH of the resultant mixture was adjusted to between 7.6 and 7.8 using a 50% by weight aqueous solution of dimethylethanolamine. The viscosity of the mixture was then adjusted to 60–70 seconds (number 3 Zahn cup) by dilution with deionized water. The Brookfield viscosity was 3900 centipoises at a spindle speed of 2 revolutions per minute and 1880 centipoises at a spindle speed of 20 revolutions per minute (number 4 spindle), indicating that the formulation was thixotropic. A dispersion of the desired pigment in a liquid acrylic ester polymer was then added, after which the viscosity and pH were adjusted as previously described.

The final coating formulation was evaluated by spraying it onto steel panels that were maintained in a vertical position. The coatings were applied at a thickness of 0.008 inch (0.02 cm.) when wet, which is equivalent to a dry film thickness of 0.003 inch (0.008 cm.). Any imperfections in the coating, such as "sagging", were noted. The coated panels were allowed to air dry for six minutes, after which they were baked at a temperature of 93° C. for 6 minutes followed by a bake at 182° C. for 13 minutes. Any blistering, "cratering" or other imperfections were noted. The coatings prepared using the formulation described in this example were completely free of defects, including "sagging" and blistering.

A second formulation was prepared using the foregoing procedure with the exception that the amine-modified smectite clay was replaced by an equal amount of a smectite clay which had been modified with an organic compound that is not within the scope of the present invention. This clay is available as Bentone ® 27 from NL Industries. The coating prepared using this formulation exhibited sagging when applied to a vertically oriented metal panel at a thickness of 0.008 inch (0.02 cm.).

EXAMPLE 2

A coating composition which is outside the scope of the present invention was prepared by blending together the following ingredients of the first component.

|  | Parts |
| --- | --- |
| Polyester resin (as per Ex. 1) | 14.1 |
| Dimethylethanolamine | 1.0 |
| Methoxylated melamine (Cymel ® 303) | 4.9 |

-continued

|  | Parts |
| --- | --- |
| Deionized water | 9.4 |
| Finely divided silica | 20.0 |
| Barium sulfate (barytes) | 12.1 |
| Micronized polyethylene wax (Ex. 1) | 1.0 |

The first component was stirred rapidly using a Cowels type blade until the mixture exhibited a fineness of 3 on the Hegman N.S. scale. The first component was then combined with 0.7 parts of dimethylethanolamine, 10.5 parts of the aforementioned polyester resin and 26.5 parts of deionized water. The resultant mixture was then combined with the following ingredients to form the final coating composition.

| Ingredient | Parts |
| --- | --- |
| Master batch | 400.0 |
| Resimix N (Example 1) | 4.0 |
| Odorless mineral spirits (Example 1) | 24.0 |
| n-butanol | 8.0 |
| Deionized water | 12.0 |
| Pigment* | 32.0 |

*Added as a dispersion in a liquid acrylic polymer medium.

The coating formulation was sprayed onto vertically oriented panels at a coating thickness of about 0.008 inch (0.02 cm.) when wet. The viscosity of the coating was not sufficient to avoid flowing following application, with the result that the coating exhibited a considerable amount of "sagging" and was non-uniform in appearance.

What is claimed is:

1. A thixotropic aqueous coating composition comprising
    (1) from 15 to 25%, based on the weight of said composition, of a film-forming, solubilized polymer,
    (2) from 0.5 to 5%, based on the weight of said composition, of finely divided silica,
    (3) sufficient water to achieve a concentration of non-volatile materials of from 30 to 60%, based on the weight of said composition,
    (4) from 0.5 to 5%, based on the weight of said composition, of a smectite type clay which has been modified by reaction with a quaternary ammonium salt of the general formula $R_2^1R_2^2N^{\oplus}X^{\ominus}$ wherein $R^1$ is alkyl and contains from 1 to 4 carbon atoms, $R^2$ is alkyl and contains from 12 to 20 carbon atoms and X is chlorine or bromine, said smectite clay being present as a dispersion in a water-immiscible liquid aliphatic hydrocarbon that constitutes from 1 to 10% of the total weight of said aqueous coating composition and boils within the range from 100° to 200° C.
    (5) from 0.1 to 1%, based on the weight of said composition, of a monohydric alcohol of a molecular weight from 32 to 118, and
    (6) from 0.5 to 5%, based on the total weight of said composition, of a cationic surfactant.

2. An aqueous coating composition according to claim 1 wherein the film-forming polymer is a polyester.

3. An aqueous coating composition according to claim 1 wherein $R^1$ is methyl.

4. An aqueous coating composition according to claim 1 wherein $R^2$ is octadecyl.

5. An aqueous coating composition according to claim 1 wherein said liquid aliphatic hydrocarbon boils within the range from 179° to 198° C.

6. An aqueous coating composition according to claim 1 wherein said monohydric alcohol is methanol or ethanol.

* * * * *